United States Patent [19]

Huston

[11] Patent Number: 4,565,923
[45] Date of Patent: Jan. 21, 1986

[54] IMAGE CONVERTER HAVING SEPARATE AND SEQUENTIAL SWITCHING OF DEFLECTOR PLATE POTENTIALS

[75] Inventor: Alexander E. Huston, Berkshire, England

[73] Assignee: Hadland Photonics Limited, Bovington, England

[21] Appl. No.: 433,968

[22] Filed: Oct. 13, 1982

[30] Foreign Application Priority Data

Oct. 15, 1981 [GB] United Kingdom ............... 8131152
Aug. 10, 1982 [GB] United Kingdom ............... 8222999

[51] Int. Cl.$^4$ ............................................ H01J 31/50
[52] U.S. Cl. ............................. 250/213 VT; 313/529
[58] Field of Search ............... 250/213 VT; 313/525, 313/532, 542, 543, 528, 529, 537; 315/395

[56] References Cited

U.S. PATENT DOCUMENTS

4,012,657 3/1977 Loty .............................. 313/529 X
4,243,878 1/1981 Kalibjian ..................... 250/213 VT
4,467,189 8/1984 Tsuchiya ..................... 250/213 VT

Primary Examiner—Edward P. Westin
Attorney, Agent, or Firm—Walter C. Farley

[57] ABSTRACT

A two dimensional array of image positions on the screen of an image converter is provided by switching the potentials applied to each of the deflector plates, which are arranged in pairs, one at a time in sequence, each step change in the applied potential for a given deflector plate being sufficient to shift the image position from one position to the next in the array. Pairs of plates can be arranged in orthogonal relationships. Shifting of image positions is performed in the intervals between shutter pulses and the durations of the shutter pulses and the inter-pulse intervals are individually adjustable. The converter includes a programmable memory for holding data words representing the said intervals and circuitry for converting these data words into timing signals for the shuttering and switching of the image converter.

3 Claims, 11 Drawing Figures

IMAGE CONVERTER HAVING SEPARATE AND SEQUENTIAL SWITCHING OF DEFLECTOR PLATE POTENTIALS

BACKGROUND TO THE INVENTION

This invention primarily relates to image converters and to cameras incorporating image converters operated in a framing mode. The invention may be applicable to cathode ray tubes other than image converters.

Methods of using image converter tubes, hereinafter called simply image converters, to produce, for example, a multiplicity of two dimensional images at high repetition rates are well known. In these methods, an electron beam is usually governed by two operations. The first comprises switching the beam on and off repetitively so as to provide, in effect, a shuttering action. The second is the deflection of the beam in such a way that the successive images appear at different parts of the screen of the tube. The present invention is primarily though not exclusively concerned with the second operation.

In order to deflect an electron beam in an image converter to successive stationary positions on the screen it is necessary according to the ordinary practice hitherto to generate a staircase waveform for application to a pair of electrostatic deflector plates. As is described by A. E. Huston and S. Majumdar in "The Imacon—a new image converter camera" Proceedings of the Eighth International Congress on high speed photography, pages 25 and 26 (Stockholm 1968) a sinusoidal oscillation was used to provide repetitive shuttering by deflection of the electron beam across an aperture. The beam was deflected to give two vertically separated positions and circuits using thermionic valves were used to generate a staircase waveform to give horizontal deflection to discrete positions on the tube screen. Such a technique provides a framing camera with a multiplicity of image positions in two rows. The amplitude of each step of a staircase must be of the order of at least 400 volts and in practice a multiplicity of steps are necessary. The control and timing of the application of potentials to the deflector plate must be performed by circuits which can accommodate potentials of several thousand volts. This necessity is rather inconvenient and in particular is not easily made compatible with the use of solid state devices in such circuits.

SUMMARY OF THE INVENTION

One, though not the only, object of the invention is to provide for deflection of an electron beam in an image converter tube used in a framing mode by means of comparatively low potentials. In particular, in a preferred embodiment of the invention, a fifteen frame pattern of images may be obtained using maximum potentials of the order of 400 volts applied to a deflector plate.

In one method according to the invention, the position of an image formed by an electron beam on the screen of an image converter having at least one pair of electrostatic deflector plates is changed by applying different potentials to the deflector plates, changing one of the applied potentials so as to change the position of the image and then changing the other potential, usually in an opposite sense, so as to provide another distinct position for the image. Preferably, although not essentially, the different potentials are positive and negative respectively with respect to earth and in practice may be the order of +200 volts and −200 volts respectively.

In order to provide additional positions for the image the same technique of applying and changing the potentials may be used for at least one other pair of electrostatic deflector plates. Preferably each change in the potential of any plate is effected in a single step which may be limited to about 400 volts.

By providing a pair of electrostatic deflector plates orthogonal to the first, a two dimensional array of image positions may be obtained in any given switching cycle. In such a cycle, the progression of image positions with time along the rows of the array would normally be in opposite directions for adjacent rows. In general, the sequence of image positions is such that successive image positions are always adjacent, that is to say the distance from one image position to the next in the sequence need never be more than either one frame height or one frame width.

In a preferred form of the invention the electrostatic deflector plates in the image converter may be driven by respective pulse amplifiers which are controlled by timing signals defining the shuttering action of the image converter and which are produced in accordance with the durations of the exposures and the intervals between them. For each switching step required for altering the image position on the screen between exposures the appropriate pulse amplifier, as determined by a logic circuit, may be triggered in response to the termination of a preceding exposure, for example by responding to the trailing edge of a pulse defining that exposure.

In known image converter cameras, such as that described in the aforementioned article, the shuttering durations and relative timing are not conveniently adjustable. An aspect of the present invention is to facilitate the programming of the exposure times and the delays between exposures. For this purpose, according to this aspect of the invention, an image converter is characterised by a programmable memory adapted to contain data words and means cooperating with the memory to convert said data words into timing signals for shuttering the image converter and the intervals between shuttering. The memory may be arranged to store a multiplicity of data words each defining a number proportional to the duration of the respective exposure or delay. A counter may be incremented at a suitable clock rate and the contents thereof may be compared with each data word in turn, parity between the said contents and data word being used to produce a timing signal for the driving circuits of the image converter, to reset the counter and to change the addressing of the memory so as to select the next word for comparison. One important advantage of this and similar arrangements is the ease with which the programming of the said durations may be altered.

Another aspect of the invention concerns the changing of the format of image positions. This may be performed by altering the gating performed by the logic circuit which responds to timing signals controlling the shuttering and governs the selection of pulse amplifiers for the deflector plates of the tube.

DETAILED DESCRIPTION

Figure 5:
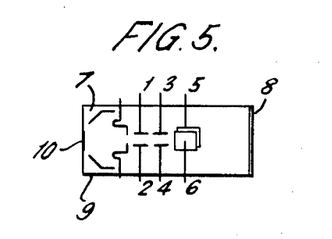
FIG. 5 illustrates a preferred form of image converter tube.
Figure 6:
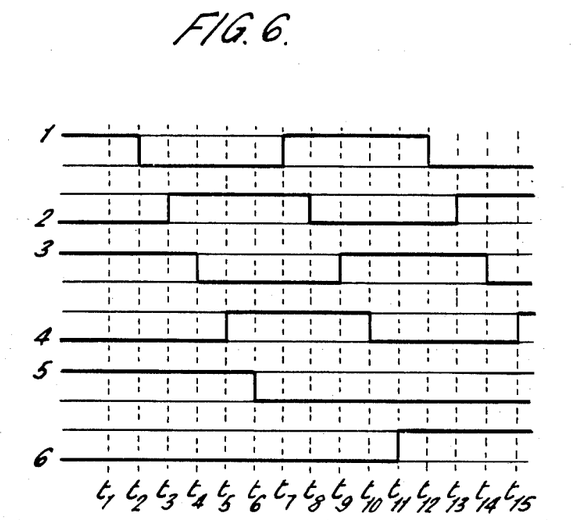
FIG. 6 illustrates a preferred method and sequence of applying potentials to deflector plates in the tube shown in FIG. 5.
Figure 7:
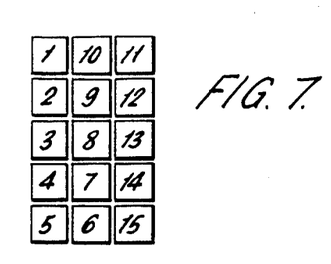
FIG. 7 illustrates schematically a format of image positions obtainable using the tube shown in FIG. 5 and the method illustrated by FIG. 6.
Figure 8:
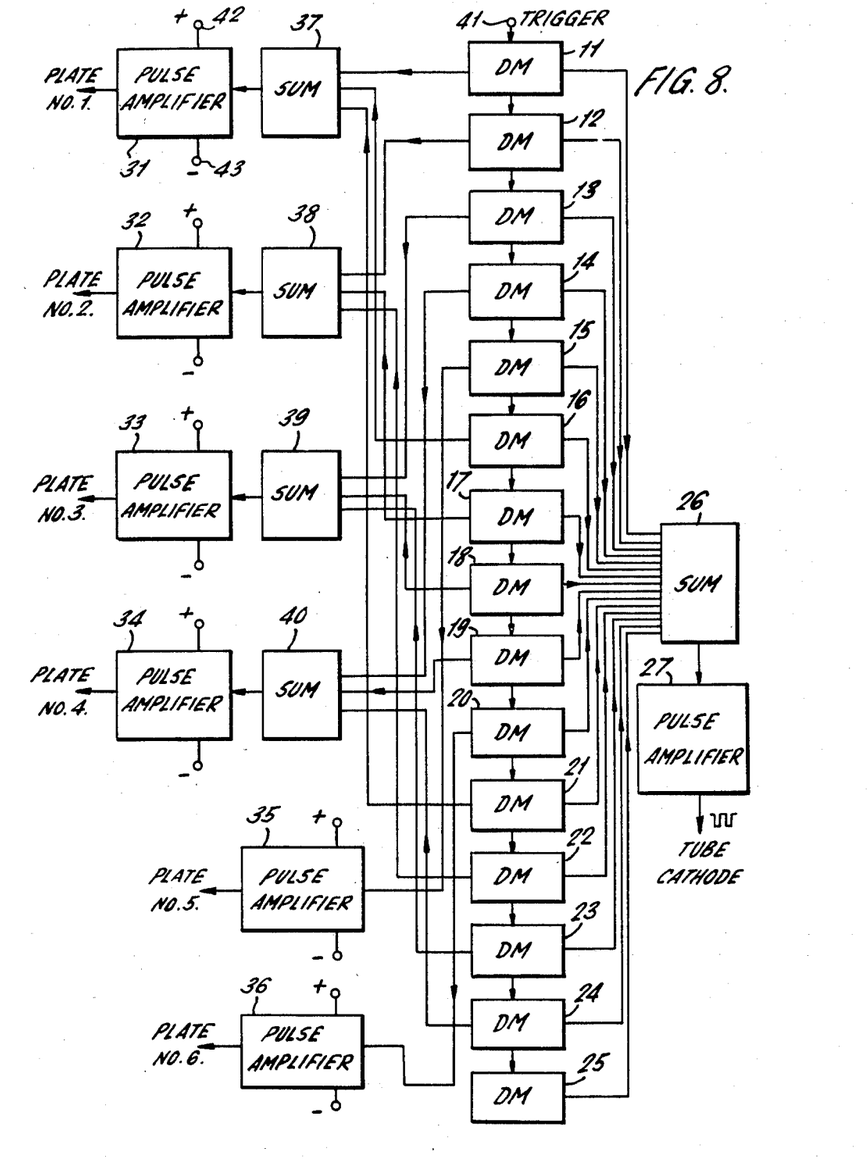
FIG. 8 illustrates one form of pulse generating circuit for use with the tube shown in FIG. 5.
Figure 10:
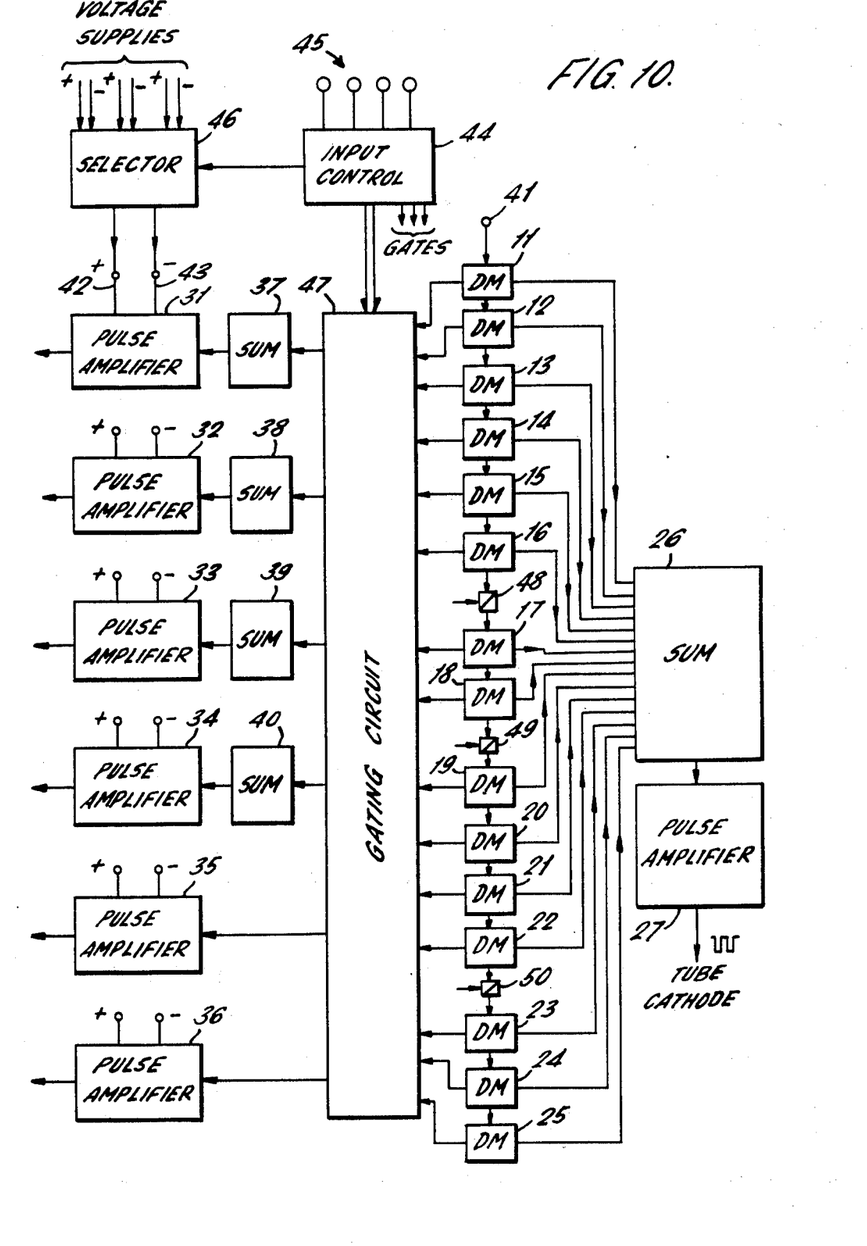
FIG. 10 illustrates a modification of FIG. 8.
Figure 11:
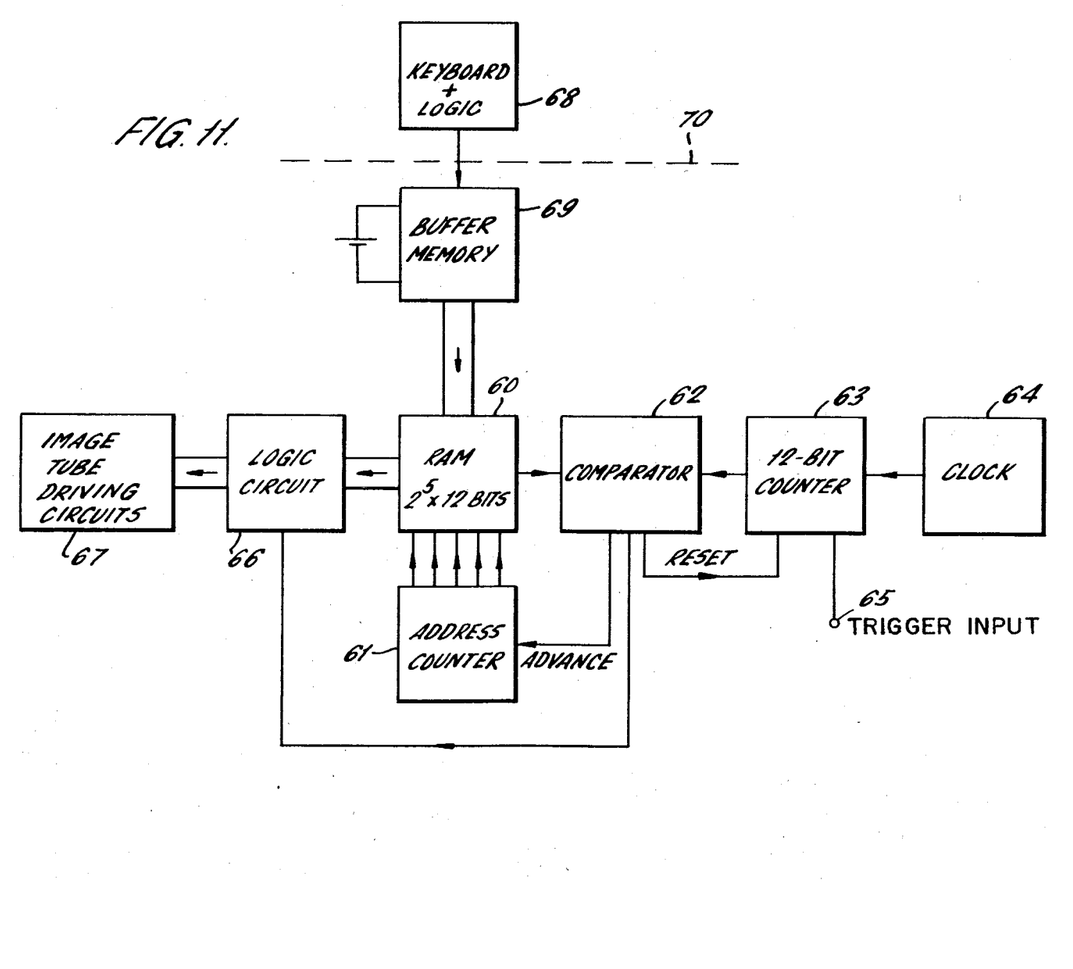
FIG. 11 illustrates a programmable arrangement for the production of timing signals for shutter pulses and deflection pulses.

In the following description, the first four figures illustrate, mainly for the purposes of explanation, the manner in which potentials applied to deflector plates in an image converter tube may be switched so as to produce a multiplicity of image positions on the screen of the image converter. FIGS. 5 and 6 illustrate schematically a more practical embodiment of an image converter tube and the method of switching the potentials applied to the deflector plates thereof in order to produce a two dimensional array of positions. A typical format of image positions is illustrated in FIG. 7. FIG. 8 illustrates one practical arrangement for generating the shuttering pulses and deflection pulses for an image converter of the kind shown in FIG. 5. FIG. 10 illustrates in general schematic terms how FIG. 8 may be modified to provide for alteration of the format of the image positions on the screen of the image converter and FIG. 11 illustrates a programmable arrangement which may have general applicability in image converters but which is preferably used in conjunction with the arrangement shown in FIGS. 5, 8 and 9.

Figure 1:
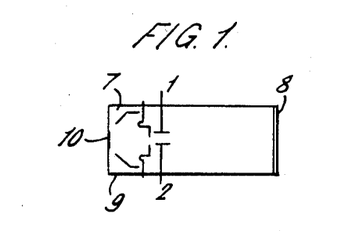
FIG. 1 schematically represents in simplified form an image converter tube.

FIG. 1 illustrates a basic form of image converter tube in which a pair of electrostatic deflector plates 1 and 2 are disposed at a convenient point between a beam forming system 7 and the fluorescent screen 8 of the image converter tube 9. The tube is illustrated schematically as possessing a photocathode 10 at the end opposite the screen. It will be understood that it is desired to produce a succession of images at different positions on the screen 8 by means of the application of a sequence of different sets of potentials to the deflector plate 1 and 2. It is usual to suppress the electron beam current in the tube before and after the sequence of images and also during transition periods while the beam moves from one location on the screen to another. This suppression may conveniently be performed by the application of a train of pulses of suitable amplitude, between the cathode and focus electrodes of the tube, appropriately synchronised to the deflection of wave forms which will be described in what follows. However, the particular manner of construction of the tube for this purpose is not of importance to the present invention and it will be presumed that the skilled reader is familiar with the general manner of construction and operation of image converter tubes and will require no detailed description of such matters as the generation, focusing and suppression of the electron beam or the manner in which the image converter tube may be disposed in a camera incorporating such a tube.

Figure 2:
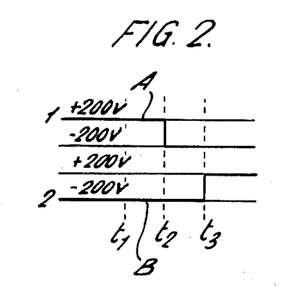
FIG. 2 illustrates a preferred manner and sequence of applying potentials to deflector plates in the tube of FIG. 1.

Reference will now be made to FIG. 2 which illustrates at A and B respectively the potentials applied to the plates 1 and 2. At an initial time $t_1$ the plate 1 is at 200 volts positive to ground potential. Accordingly, the position of the image of the screen is above the centre or mean undeflected position by an amount equivalent to the application of a potential difference of 400 volts across the plates. At a subsequent time, $t_2$, the potential on the plate 1 is changed rapidly to the same potential as is applied to the plate 2, that is to say to 200 volts negative to ground; the potential difference across the plates is thereby reduced to zero. The position of the image is therefore now central or at the mean undeflected position of the electron beam. At a subsequent time $t_3$, the potential on the plate 2 is changed rapidly to 200 volts positive to ground. Accordingly, the position of the image is moved below centre by an amount equivalent to the application of a potential difference of 400 volts across the plates.

In this manner, three successive stationary positions are provided for the image on the screen of the tube by the application to the deflector plates of step function waveforms of magnitude no greater than 400 volts. The generation of step functions of that magnitude is within the ability of currently available solid state devices.

Figure 3:
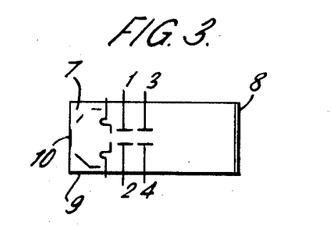
FIG. 3 schematically illustrates another form of image converter tube.

FIG. 3 illustrates a development of the tube shown in FIG. 1. The construction and manner of operation of the tube shown in FIG. 3 is generally similar to that shown in FIG. 1 but an additional pair of plates 3, 4 has been added. These plates provide for deflection of the electron beam in the same direction as the plates 1 and 2.

Figure 4:
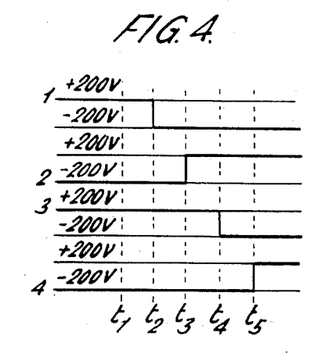
FIG. 4 illustrates a preferred manner and sequence of applying potentials to deflector plates in the tube shown in FIG. 3.

FIG. 4 illustrates the sequence and manner in which the potentials applied to the plates 1 to 4 are changed. It will be noted that initially the plates 1 and 2 are at +200 volts and −200 volts respectively as are the plates 3 and 4 respectively. The potentials supplied to the plates 1 and 2 are changed in the same manner as has been described with reference to FIG. 2 and thereafter the potentials applied to the plates 3 and 4 are changed similarly. This sequence of change provides five successive stationary image positions even though no potential difference is greater than 400 volts between the plates of any pair.

A two dimensional array of images may be obtained if at least one additional pair of deflector plates is used to deflect the electron beam in a plane at right angles to the plane in which the plate shown in FIGS. 1 and 3 provide deflection. FIG. 5 therefore illustrates a preferred form of an image converter tube which can provide a two dimensional array of image positions for each cycle of switching of the potentials applied to the deflector plates thereof.

In the tube shown in FIG. 5, the image converter tube 9 which has at one end a photocathode 10 and at its other end a fluorescent screen 8 has three pairs of electrostatic deflector plates. The first pair of plates 1 and 2 and the second pair of plates 3 and 4 are disposed to provide deflection of the electron beam in the same plane whereas the third pair of deflector plates 5 and 6 are disposed to provide orthogonal deflection of the electron beam. The plates 1 to 6 are disposed between the beam forming system 7 and the screen 8. The particular construction of the tube is not important provided that the plates can operate in the manner desired and in practice the tube may be constituted by a P856 image converter tube. Such a tube is described by A. E. Huston and F. Walters in "Electron Tubes for High Speed Photography" in Advances in Electronics and Electron Physics, Volume 18 pages 249–263 (published 1962).

FIG. 6 illustrates the manner in which the potentials on the plates 1 to 6 shown in FIG. 5 may be changed separately in sequence to produce an image format as shown in FIG. 7, in which the numerals indicate the sequence of the image positions in the format. The image positions shown in FIG. 7 are provided at the respective times $t_1$, $t_2$, etc., shown in FIG. 6. It will be noted that the format is achieved by means of a sequence comprising (a) switching the potentials on the plates 1 to 4 at times $t_2$ to $t_5$ as described with reference to FIG. 4, (b) switching the potential on plate 5 from $+200$ volts to $-200$ volts at time $t_6$, (c) switching the potentials on plates 1 to 4 at times $t_7$ to $t_{10}$ in the same sequence but in opposite sense to the switchings for times $t_1$ to $t_5$ respectively, (d) switching the potential on plate 6 at time $t_{11}$ and (e) repeating at times $t_{12}$ to $t_{15}$ the sequence of switchings for the times $t_2$ to $t_5$. In each case any given deflector plate is switched from one of two different potentials to another and the potentials on the plate are switched one at a time in the sequence which produces the required format. Thus, a three by five array of image positions can be provided using only two supply potentials for the deflector plates.

Although the intervals between switchings are shown as being equal in FIGS. 2, 4 and 6, in general they need not be equal and, as described later with reference to FIG. 10, the sequence of switchings of the deflection potentials may form part of a programmable sequence for the exposures and intervals between exposures.

As has been previously mentioned it is appropriate to provide for the blanking of the beam before and after the switching sequence and the times when the potential on any deflector plate is changed.

It is not essential to render the potentials applied to the plates of the pair equal at any time. For example, in the method illustrated by FIG. 2, the potential on the plate 1 may be switched from 200 volts positive to a potential other than 200 volts negative so that the intermediate position of the image is off centre.

Although in the foregoing the potentials of both plates in any given pair are switched in each cycle of switching, it is feasible to maintain the potential of one plate in a pair fixed and to switch the other plate between two potentials in a single step. This method provides, of course, only two distinct positions of the image and the number of distinct positions obtainable by the use of more than one pair of plates would be likewise diminished.

FIG. 8 illustrates one embodiment of a system for the generation of shutter pulses and deflection pulses for a camera which incorporates an image converter arranged to provide a fifteen frame format as described with reference to FIGS. 5 to 7.

The system shown in FIG. 8 includes a chain of fifteen dual monostable integrated circuits 11 to 25. One half of each monostable is used as a delay generator and the other as a shutter pulse generator. The duration of each shutter pulse and the delay following the shutter pulse may be selected by adjustment of the circuitry associated with the respective monostable circuit, the monostable circuits preferably being of known type (74LS22) permitting such adjustment. The fifteen monostables are connected in series so that an an external trigger 41 initiates the first monostable 11, the first monostable 11 provides initiation for the second monostable 12, and so on.

The outputs of all the shutter pulse generators formed by the respective halves of the monostables 11 to 15 are fed to a sum circuit 26 to provide thereby a train of shuttering pulses. This train is fed to a pulse amplifier 27, the output amplitude of which is sufficient to switch the electron beam in the tube on and off and therefore provide repetitive shuttering. Preferably, as shown, the pulse amplifier 27 applies shutter pulses negatively to the photocathode 10 of the image converter tube schematically illustrated by FIG. 5.

The trailing edges of the shutter pulses are used to control circuits which provide image positioning. This positioning is effected by six pulse amplifiers 31 to 36. These amplifiers are coupled to the plates 1 to 6 respectively and each provide when triggered a potential swing between substantially the potential of one supply line to the potential of another in the manner generally described earlier with reference to, for example, FIG. 6.

The outputs of the respective halves of the monostables 11 to 25 are coupled to provide triggering of the pulse amplifiers in the desired sequence. It will be understood that each monostable provides a first pulse which is fed to the sum circuit 26 and a second pulse, starting coincident with the trailing edge of the first pulse, the second pulse being fed for triggering one or another of the pulse amplifiers in the sequence required by the particular format of image positions selected.

The plates 5 and 6, which are orthogonal to the plates 1 and 4, are required to provide a switching only once in each cycle of switching but the pulse amplifiers 31 to 34 are required to switch more than once and in fact they switch three times for the particular format for which the connections are illustrated. Thus the pulse amplifiers 31 to 34 are preceded by respective sum circuits 37 to 40.

Although different sequences are, of course, possible, the connections between the triggering monostables 11 to 15 and the switching circuits for controlling the plates 1 to 6 are intended to provide a switching sequence as illustrated in FIG. 6 and thereby to provide the format of image positions as illustrated in FIG. 7.

Figure 9:
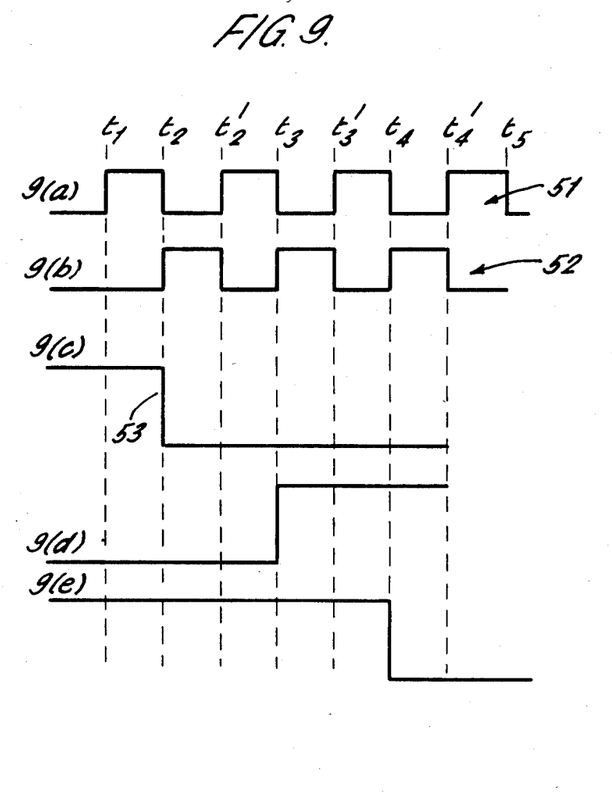
FIG. 9 illustrates the timing of shutter pulses.

FIG. 9 illustrates the first part of FIG. 6 but shows the relative timing of the shutter pulses which are interposed in time between the times of switching of the potentials on the deflector plates. The times $t_1$, $t_2$ etc. have the same significance in FIG. 9 as they do in FIG. 6 but additional times such as $t_2'$ have been introduced in FIG. 9 to show the timing of the shutter pulses.

In FIG. 9, the waveform 9(a) illustrates the train of shutter pulses 51 constituted by the output of the sum circuit 26. The waveform 9(b) illustrates the timing of the pulses 52 which are produced from the second halves of the monostables 11 to 25 in turn. Waveforms 9(c), 9(d) and 9(e) illustrate the potentials applied to the plates 1, 2 and 3 respectively and correspond to the forms shown for the plates 1, 2 and 3 by FIG. 6.

Accordingly, at time $t_1$, the first dual-monostable 11 is triggered, for example by a trigger signal applied to an input 41. This initiates the first shutter pulse 51 of which the trailing edge occurs at time $t_2$. Immediately the first pulse for the deflector circuits is produced at the output of the second half of the first dual-monostable 11 and is fed through the sum circuit 37 to the pulse amplifier 31. After a short delay the output of that pulse amplifier changes from the potential of a positive supply line 42 to the potential of a negative supply line 43, as shown by the transition 53 in FIG. 9.

At time $t_2'$ the first pulse 52 terminates and the trailing edge thereof triggers the second dual-monostable 12 so as to initiate the second shutter pulse which lasts until time $t_3$. The trailing edge of that shutter pulse initiates the next "deflection" pulse produced by the second half of the dual monostable 12. This deflection pulse is fed through sum circuit 38 to trigger pulse amplifier 39. As illustrated by waveform 9($d$) the potential on plate 2 is switched from the negative value to the positive value as previously illustrated by FIG. 6.

The production of shutter pulses alternately with the switching of a potential on a particular plate thus proceeds, the shutter pulses being initiated at times $t_3'$, $t_4'$ etc. and the appropriate potentials being switched on the respective plates at times $t_4$, $t_5$ etc. as previously illustrated with reference to FIG. 6.

As previously indicated, all the pulse amplifiers are arranged to switch the respective output between two potentials determined by two supply potentials provided for the respective amplifier. In general the supply potentials for the pulse amplifiers 31 to 34 will be the same at any given time but those supply potentials and those used for pulse amplifiers 35 and 36 may be changed so as to alter the distance between adjacent image positions.

In the arrangement shown in FIG. 8 the programme of exposures can be altered by adjustment of the individual dual-monostables. This adjustment can be used to alter the duration of the individual exposures and the intervals between them.

In an image converter camera the dimensions of the image tube screen forms a limit to the amount of information which can be recorded and it is useful to be able to alter the number and size of frames to make maximum use of the space available on the screen. It is readily possible, using the arrangement of FIG. 8 to provide, for example, formats of 15, 12, 8 or 6 frames by altering the routing of the outputs from the dual-monostable circuits to the deflection pulse amplifiers and by interrupting the series connection of the dual-monostable circuits after the selected number of shutter pulses have been produced. It is usually also desirable to alter the frame size so that, for example, the frame size is 12 mm by 12 mm for a format of fifteen frames, 15 mm by 12 mm for a format of twelve frames, 16 mm by 20 mm for a format of eight frames and 20 mm by 20 mm for a format of six frames. This change in frame size requires the alteration of the supply potentials to the deflection pulse amplifiers. However, such alteration is merely a matter of providing selectable supply rails and the rerouting of the outputs from the shutter pulse generators constituted by the dual-monostable circuits and the interruption of the chain of shutter pulse generators is a straightforward exercise in switching logic.

The variation in frame size as discussed above can be achieved by providing a multiplicity of pairs of supplies varying from 220 volts positive and negative to approximately 400 volts positive and negative. The rerouting of the outputs from the shutter pulse generators and the interruption of the chain thereof follows directly from the sequence of switching which is required. For example, for a six frame format, a gate between monostable 16 and 17 must be closed to prevent triggering of the monostable 17 to 25 after the sixth shutter pulse and on the assumption that the format of image positions is to be constituted by a three by two array, the required deflections can be achieved by following the sequence shown in FIG. 2 twice separated by a switching of, for example, the potential on plate 5. For this purpose the respective outputs from monostables 11 and 14 may be routed to the sum circuit 37, the outputs from monostables 12 and 15 may be routed to sum circuit 38, the output from monostable 14 may be routed to pulse amplifier 35 and the output from monostable 16 may be inhibited from triggering any of the circuits 37 to 40 so that the monostable 16 provides only the sixth shutter pulse.

It will be apparent that the selector for voltage supplies for the pulse amplifiers and the logic circuit controlling the routing and series connection of pulses from the monostables are easy to construct, and to avoid tedious repetition FIG. 10 merely shows the selector arrangement schematically.

FIG. 10 illustrates the monostables 11 to 25, the sum circuit 26 and the pulse amplifier 27, the pulse amplifiers 31 to 36 and the sum circuits 37 to 40 as already described with reference to FIG. 8. An input control circuit 44 provided with four push button inputs 45 controls a selector circuit 46 which selects any pair of a multiplicity pairs of positive and negative supply lines for application to the respective pulse amplifiers so as to provide the frame sizes required as hereinbefore set forth. The connection between the selector circuit 46 and the pulse amplifiers is shown only for the pulse amplifier 31 for the sake of convenience. Where, as for example twelve or eight frames are selected the supplies for the amplifiers 35 and 36 will be different for those for the other four amplifiers of 31 to 34.

The input control circuit 44 also provides conditioning for a gating circuit 47 so as to control the rerouting as previously set forth and also controls gates 48, 49 and 50 which are interposed at appropriate in the chain of monostables and in particular between the sixth and seventh, between the eighth and ninth and between the twelfth and thirteenth monostables in the chain respectively. Thus for example when only six frames are selected the gating circuit 47 provides the routing as previously described for the six frame format and gate 48 is closed to prevent triggering of monostable 17 and the subsequent monostables in the chain.

A preferable circuit for programming the shutter durations and the intervening intervals, during which switching of the plate potentials will occur is illustrated by FIG. 11. This circuit is for the most part an adjustable arrangement which provides the timing signals similar to those produced by the monostables 11 to 25 and which determine the durations of the shutter pulses and the intervals between them. The timing signals thereby produced may be used exactly as the timing signals described with reference to FIG. 8, the switching of the deflection pulse amplifiers being performed in the same manner as already described. However, one advantage of the arrangement shown in FIG. 11 is the considerable range of selection that can be performed.

The basis of the arrangement shown in FIG. 11 is a random access memory 60 which can contain up to $2^5$ data words each of twelve bits. The random access memory is preferably a fast memory, preferably having an access time of the order of 25 nano-seconds or less.

The word locations in the memory are accessed sequentially by means of an address counter 61.

The memory 60 is programmed to contain words which individually represent a respective number which is proportional to the duration of the interval, either shutter pulse duration or interpulse interval, associated with that word. The content of each address in its turn is compared by means of a comparator 62 with the content of a twelve-bit counter 63 which is reset to zero when a parity is detected by the comparator and is incremented by a clock 64. Counter 63 has a trigger input 65.

Under the control of the programmable memory and the comparator is a logic circuit 66 which provides to image driving circuits 67, at times determined by the parity signals from the comparator 62, the signals equivalent to those provided by the monostables 11 to 25 in FIG. 8.

For each interval represented by a data word in the memory 60, the counter 63 increments until the comparator 62 detects parity, whereupon a bistable in the system of bistable 66 is set and the address counter 61 is advanced so as to access the next word for comparison with the contents of the counter, the counter being reset to zero. Thus the arrangement produces a sequence of timing signals, representing alternately the commencement of a shutter pulse and the termination of a shutter pulse together with the initiation of a switching operation for a plate of the deflection system, each interval being of a duration proportional to the number represented by the associated data word.

If the minimum frame period required is 100 nanoseconds, for an accuracy of 10% the clock rate needs to be 100 megahertz. Thus a 100 nanosecond period is represented by ten clock pulses. For a word of twelve bits, the total possible count is 4096, which is equivalent to a maximum frame or interframe period of 40 microseconds. If the access time for the memory is of the order of 25 nanoseconds, the increase in the framing duration for the shortest times may be compensated using a higher clock frequency, for example 125 megahertz.

The programming of the random access memory requires only the setting of data words in accordance with the required durations, measured in increments of 10 nanoseconds, and the proper accessing of the memory for the insertion of data words. This operation is easy to perform with known equipment and is conveniently performed using a simple keyboard 68 which includes control logic enabling the accessing of the memory and the insertion of data words therein. It is preferable to interpose a buffer memory 69 which may be battery powered. This expedient is desirable because the random access memory may be volatile. The buffer memory is arranged to hold the contents of the random access memory while the camera unit (which need not include the keyboard, as indicated by the line 70) is off. When the camera unit is switched on, the data in the buffer memory 69 would be automatically transferred to the random access memory 60.

It is also feasible to provide a card reader and prepunched cards for inserting into the random access memory the data required for the specific sequence of intervals required for a particular experiment.

I claim:

1. In an image converter including a screen and means for producing a beam of electrons for forming an image on said screen, a beam deflection system comprising the combination of:
    at least one pair of electrostatic deflector plates for deflecting said beam of electrons whereby to change the position of said image on said screen; and
    means for switching each plate in said pair of plates between respective potentials in a single step whereby to provide a plurality of distinct image positions on said screen.

2. a converter as set forth in claim 1, further comprising a second pair of electrostatic deflector plates and means for switching the potentials applied to at least one plate of said second pair of plates between two different values whereby to provide in combination with the switching of the potentials of said one pair of deflector plates a multiplicity of different positions for the image on said screen.

3. A converter according to claim 1, further comprising at least a second pair of deflector plates orthogonal to said one pair of deflector plates, and means for switching the potential applied to at least one plate of said second pair of plates at a time different from the time of switching of a potential applied to a plate of said one pair, whereby the converter provides a multiplicity of stationary image positions in a two dimensional array on said screen.

* * * * *